(12) United States Patent
Ahuja et al.

(10) Patent No.: US 8,800,051 B2
(45) Date of Patent: Aug. 5, 2014

(54) SYSTEM AND METHOD FOR PRIVATE INFORMATION COMMUNICATION FROM A BROWSER TO A DRIVER

(75) Inventors: Alok Ahuja, San Jose, CA (US); Atul Chandrakant Apte, Cupertino, CA (US)

(73) Assignee: Nvidia Corporation, Santa Clara, CA (US)

( * ) Notice: Subject to any disclaimer, the term of this patent is extended or adjusted under 35 U.S.C. 154(b) by 105 days.

(21) Appl. No.: 13/172,732

(22) Filed: Jun. 29, 2011

(65) Prior Publication Data

US 2013/0007888 A1 Jan. 3, 2013

(51) Int. Cl.
G06F 21/10 (2013.01)
G06F 21/31 (2013.01)
G06F 21/60 (2013.01)

(52) U.S. Cl.
CPC .................................. *G06F 21/606* (2013.01)
USPC .................. 726/26; 726/16; 713/153

(58) Field of Classification Search
USPC ....................... 726/26, 16; 713/175
See application file for complete search history.

(56) References Cited

U.S. PATENT DOCUMENTS

| | | | |
|---|---|---|---|
| 5,778,174 A * | 7/1998 | Cain ................................. | 726/11 |
| 2002/0178218 A1 * | 11/2002 | Butlin .......................... | 709/203 |
| 2003/0046587 A1 * | 3/2003 | Bheemarasetti et al. ...... | 713/201 |
| 2005/0198487 A1 * | 9/2005 | Zimmer et al. .................... | 713/2 |
| 2007/0094673 A1 * | 4/2007 | Hunt et al. ...................... | 719/321 |
| 2007/0124474 A1 * | 5/2007 | Margulis ........................ | 709/226 |
| 2007/0136579 A1 * | 6/2007 | Levy et al. ..................... | 713/168 |
| 2008/0294674 A1 * | 11/2008 | Reztlaff et al. ............... | 707/102 |
| 2009/0083370 A1 * | 3/2009 | Franklin et al. ............... | 709/203 |
| 2012/0076197 A1 * | 3/2012 | Byford et al. ............ | 375/240.01 |
| 2012/0117145 A1 * | 5/2012 | Clift et al. ..................... | 709/203 |
| 2012/0198219 A1 * | 8/2012 | Preimesberger et al. ......... | 713/2 |

* cited by examiner

*Primary Examiner* — Techane Gergiso

(57) ABSTRACT

Systems and methods for communicating private information from a browser to a driver are presented. The private information communication method can comprise: performing a private information communication process in which private information is communicated through a private information communication plug-in of a browser to a driver; and performing a driver process based upon the private communication information communicated in the private information communication process. The private information communication process can comprise determining private information content; communicating the private information to the private information communication plug-in coupled to a private communication channel; calling a graphics driver from the private information communication plug-in using the private communication channel; and forwarding the private information from the private information communication plug to the driver via the private communication channel. The driver process can comprise: determining if there is an association between normal information and the private information, and processing the normal information in accordance with associated private. The private information can be associated with stereoscopic 3D video streaming.

14 Claims, 5 Drawing Sheets

200

---

210
Performing a private information communication process in which private information is communicated from a browser to a driver

---

220
Performing a driver process utilizing the private information communicated in the private information communication process of block 210

410 Performing a private information communication process in which private information is communicated from a browser to a driver > 411 Forwarding normal information and private information from an application to a runtime component
>
> 412 Forwarding the normal information is forwarded from the runtime component to a driver and the private information is forwarded to a private communication plug-in.
>
> 413 Forwarding normal information and private information from an application to a runtime component

420
Performing a driver process utilizing the private information communicated in the private information communication process.

> 421 Copying by the driver of the left and the right view data from the source texture into two separate surfaces, which are then page flipped.
>
> 422 Blanking out the right "eye" out when the left view is being flipped, and blanking out the left "eye" is blanked out when the right view is being flipped.

FIG 4

SYSTEM AND METHOD FOR PRIVATE INFORMATION COMMUNICATION FROM A BROWSER TO A DRIVER

FIELD OF THE INVENTION

The present invention relates to the information processing. In particular, the present invention relates to a system and method for private information communication from a browser to a driver.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Frequently, these activities involve using various auxiliary components in presenting browser related information. However, communicating information to and from browsers can be difficult as communications to and from browser are often limited.

Typically, something that is running within a browser is running within a "sandbox" environment and has no or very limited ability to communicate outside the browser. Due to security concerns browsers typically limit the communications to anything running within the browser and do not typically allow communication with other files within the computer. This can be particularly problematic for scenarios that could use private information (e.g., metadata, arguments, etc.) outside the browser. For example, it is typically difficult or prohibited for something in a browser to communicate private information with a driver. This in turn often limits user experiences. For example, scenarios associated with stereoscopic video streaming within a browser do not typically permit communication of private information that could enable more advanced three dimensional (3D) stereoscopic video display.

SUMMARY

Systems and methods for communicating private information from a browser to a driver are presented. In one embodiment a private information communication method comprises: performing a private information communication process in which private information is communicated through a private information communication plug-in of a browser to a driver; and performing a driver process based upon the private communication information communicated in the private information communication process. In one exemplary implementation the private information communication process comprises: determining private information content; communicating the private information to the private information communication plug-in coupled to a private communication channel; calling a graphics driver from the private information communication plug-in using the private communication channel; and forwarding the private information from the private information communication plug-in to the driver via the private communication channel. The driver process can comprise: determining if there is an association between normal information and the private information, and processing the normal information in accordance with associated private information. In one embodiment, the private information is associated with stereoscopic 3D video streaming.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 2 is a flow chart of an exemplary private communication method in accordance with one embodiment of the present invention.

FIG. 4 is a flow chart of another exemplary private communication method in accordance with one embodiment of the present invention.

DETAILED DESCRIPTION

Figure 1:
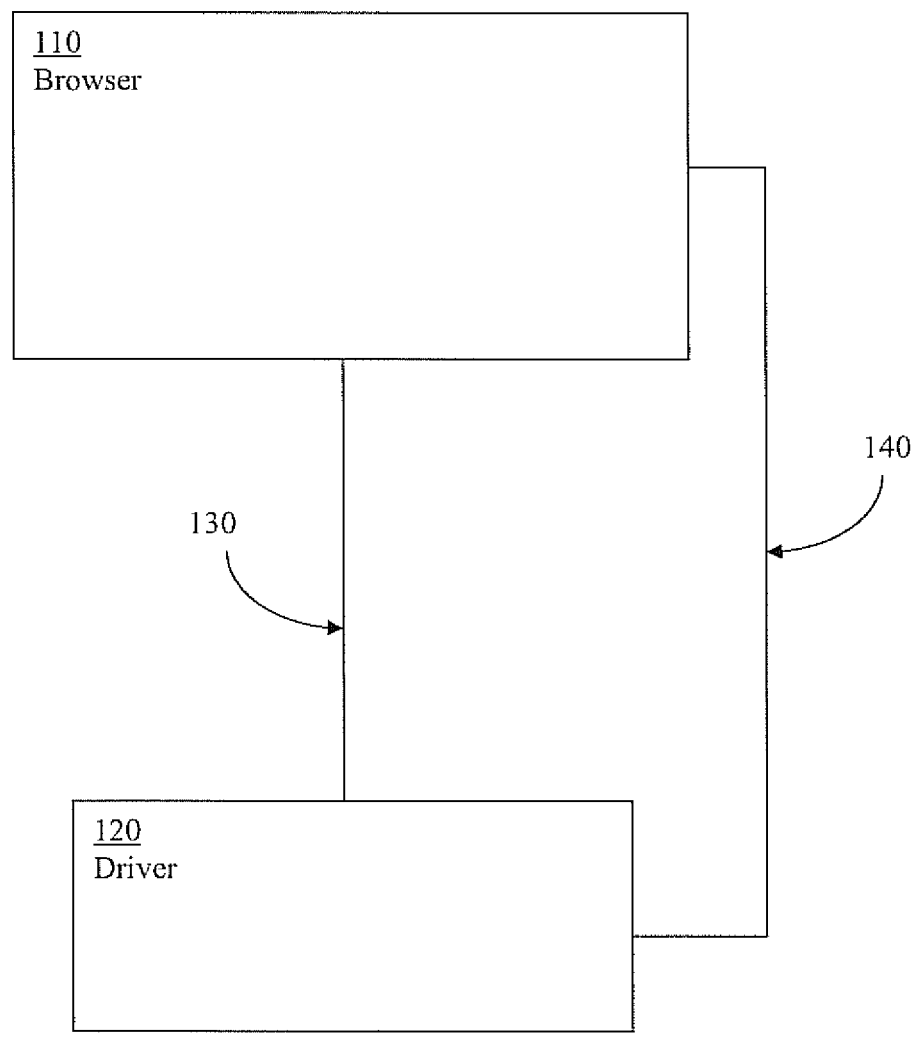
FIG. 1 is a block diagram of an exemplary private communication system in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present systems and methods facilitate communication of private information from a browser to a driver. In one embodiment, private communication information is forwarded from a browser to a driver through a private information communication plug-in. In one exemplary implementation, private communication information is forwarded in a dedicated private information communication channel. The private information communication can be utilized to allow applications in a browser that are not naturally aware of a characteristic or feature (e.g., stereoscopic three dimensional video, audio bit-rate, etc.) to communicate information about the feature or characteristic to a driver. In one embodiment, the private information (e.g., metadata, arguments, etc.) is utilized by the driver in the processing of corresponding normal information (e.g., video content, audio content, etc.) for communication to a component being driven.

It is appreciated that present systems and methods can be implemented in a variety of situations or environments. Present systems and methods can facilitate rendering of stereoscopic 3D video for an in-browser player application. In one embodiment, metadata corresponding to the stereoscopic 3D video is forwarded from a player that is running in a browser via a private information communication plug-in through a private information communication channel to a graphics processing unit (GPU) software display driver. In one exemplary implementation, calls associated with normal information (e.g., surface information, content bit stream, etc.) from the application communicated on a normal information communication channel are "intercepted" by the driver and processed utilizing the corresponding private information (e.g., metadata, arguments, etc.) communicated on the private communication channel in order to facilitate displaying the stereo views correctly on a 3D capable display. Additional description of the present systems and methods is set forth in the following detailed description.

FIG. 1 is a block diagram of exemplary private communication system 100 in accordance with one embodiment of the present invention. Private communication system 100 includes browser 110, driver 120, normal communication channel 130 and private communication channel 140. Browser 110 is communicatively coupled to normal communication channel 130 and private communication channel 140 which in turn are communicatively coupled to driver 120.

The components of private communication system 100 cooperatively operate to communicate information from the browser 110 to the driver 120. Browser 110 performs a variety of browser operations including forwarding various normal information to normal communication channel 130 and private communication information to private communication channel 140. Normal communication channel 130 communicates normal information to driver 120. Private communication channel 140 communicates private information to driver 120. Driver 120 forwards the information to a component driven by driver 120. It is appreciated a variety of different drivers can be included (e.g., a graphics processing unit display driver, graphics accelerator display driver, a graphics engine display driver, an audio speaker driver, etc.). In one embodiment, driver 120 performs interface operations for information communicated to the component driven by driver 120.

In one embodiment, browser 110 includes a private information communication plug-in component for coordinating communication of information to driver 120. In one exemplary implementation, the private information communication plug-in runs within a browser "sand box" or restricted environment and can forward private information (e.g. metadata, arguments, etc.) from the browser sand box environment to the driver. The private information communication plug-in can be installed as part of the driver installation (e.g., a user does not have to explicitly download and install the private information communication plug-in, etc.). In one embodiment, the private information would not otherwise be communicated to driver 120.

FIG. 2 is a flow chart of exemplary private communication method 200 in accordance with one embodiment of the present invention.

In block 210, a private information communication process is preformed in which private information is communicated from a browser to a driver. In one embodiment, the private information is communicated in a dedicated private information communication channel (e.g., path, pipeline, etc.). In one exemplary implementation, the private information is communicated via a private information communication plug-in within the browser. The private information can include metadata. The metadata can be associated with or related to normal information communicated to the driver (e.g., video content, audio content, etc.). In one exemplary implementation, the private information communication process comprises: determining private information content; communicating the private information to the private information communication plug-in coupled to a private communication channel; calling a graphics driver (e.g., GPU display driver, GPU audio driver, etc.) from the private information communication plug-in using the private communication channel; and forwarding the private information from the private information communication plug-in to the driver via the private communication channel.

In block 220, a driver process is performed utilizing the private information communicated in the private information communication process of block 210. In one embodiment, the private information is utilized in coordination with normal information communicated to the driver. In one exemplary implementation, normal information communicated to a driver includes content and the private information includes metadata corresponding to the content, and the metadata is utilized in driver processing activities associated with the content. The metadata can be utilized to impact how the driver prepares content (e.g., processes associated normal information, configures information, etc.) for communication to a driven component (e.g., an auxiliary component, a display component, a speaker component, etc.). In one embodiment, the driver process comprises: determining if there is an association between normal information and the private information, and processing the normal information in accordance with associated private information. In one embodiment, the private information is associated with stereoscopic 3D video streaming.

Figure 3:
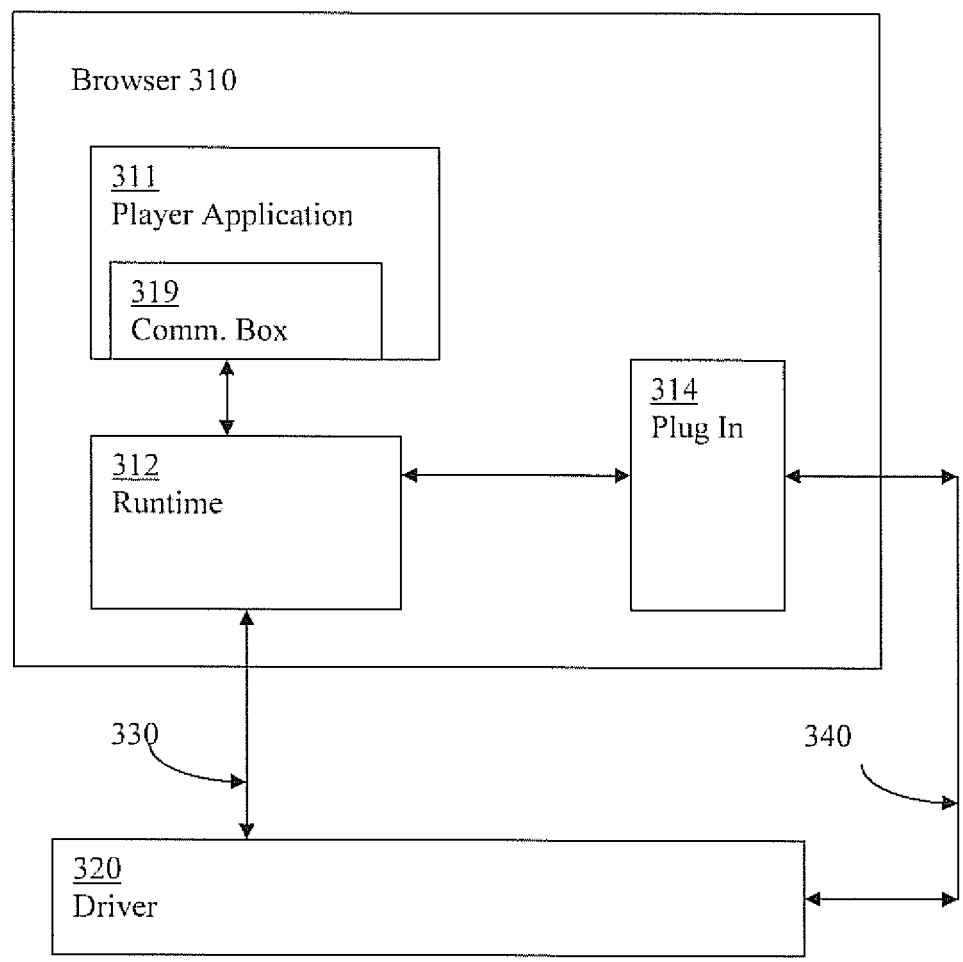
FIG. 3 is a block diagram of an another exemplary private communication system in accordance with one embodiment of the present invention.

FIG. 3 is a block diagram of private communication system 300 in accordance with one embodiment of the present invention. In one embodiment private, communication system 300 is similar to private communication system 100. In one exemplary implementation, private communication system 300 communicates stereoscopic 3D video information from a browser to a display driver.

Private communication system 300 includes browser 310, driver 320, normal communication channel 330 and private communication channel 340. In one exemplary implementation, driver 320 is a graphics processing unit (GPU) display driver. Browser 310 is communicatively coupled to normal communication channel 330 and private communication channel 340 which in turn are communicatively coupled to driver 320.

In one embodiment, browser 310 includes an application component 311, runtime component 312 and private information communication plug-in component 314. It is appreciated that the application component can include a variety of different types of application components (e.g., video player application component, an audio player application component, etc.). Similarly, the runtime component 312 can include a variety of different types of corresponding runtime components. It is also appreciated that a private information communication plug-in component can include a variety of different types of plug-ins. The private information communication plug-in can correspond to the type of browser. In one embodiment, a HTML bridge component (not shown) between runtime component 312 and private information communication plug-in 314 invokes a JavaScript component to call and forward the information to the appropriate private information communication plug-in 314.

It is appreciated that there can be a variety of different types of browsers. In one embodiment, the browser is an Internet Explorer browser and the private information communication plug-in is an ActiveX control plug-in. The browser can be a Firefox or Chrome browser and the private information communication plug-in is a Netscape plug-in application programming interface (NPAPI) based plug-in. It is also appreciated that there can be a variety of different types of applications within the browser. In one embodiment, the application is a video player within the browser (e.g., a Silverlight 4 player, a Flash player, etc.). The video player can include a graphical user interface for viewing a video (e.g., viewing area, play indicator, stop indicator, fast forward indicator, reverse indicator, pause indicator, etc.). In one exemplary implementation, a video player does not need to change to implement the present systems and methods.

The components of private communication system 300 cooperatively operate to communicate information from the browser 310 to the driver 320. Browser 310 performs a variety of browser operations including forwarding normal information to normal communication channel 330 and private communication information to private communication channel 330 via private information communication plug-in 314. Normal communication channel 330 communicates normal information to driver 320 and private communication channel 340 communicates private information to driver 320. In one embodiment, driver 320 acts as an interface and forwards information to a component (not shown) driven by driver 320. It is appreciated a variety of different drivers can be included (e.g., a graphics processing unit driver display driver, an audio speaker driver, etc.). Driver 320 performs various driver operations and processing, including coordinating utilization of the private communication in performing driver processing or operations on corresponding or associated information received on normal communication channel 330.

In one embodiment, metadata is sent from the in-browser player application to the driver, through the browser private information communication plug-in, enabling the driver to properly intercept and process corresponding normal information calls from the application. In one exemplary implementation, the private communication channel communicates metadata associated with streaming stereoscopic 3D video and the normal communication channel communicates BLIT calls. A BLIT is basically an operation of transferring a surface for display or a way for the runtime to indicate to the driver that there is a certain amount of surface content (e.g., a rectangle, a primitive, etc.) for presentation on a display. The metadata sent by the in-browser application to the browser private information communication plug-ins can include the width of the player window, the height of the player window, the stereo mode (to indicate whether the stereo source data layout is left-right, right-left, top-bottom, etc.) and a flag indicating whether to enable or disable stereoscopic 3D rendering. The metadata can also include the process id of the browser window, along with other commands (e.g., to indicate whether the metadata record should be added to, or removed from, the driver's cached record store, etc). In one exemplary implementation the browser private information communication plug-in sends the private information to the driver using a private backdoor driver interface.

As described above, in one embodiment the driver intercepts the normal information and processes it in accordance with the private information. In one exemplary implementation, if the player has bitmap caching enabled on it, then the player, through the runtime, makes per frame surface or texture BLIT calls to the driver with the video data as the input surface. The metadata (e.g., metadata described above, etc.) sent by the in-browser private information communication plug-in is used to indicate to the driver which surface or texture BLIT calls from the normal communication channel are to be intercepted. In one embodiment, if criteria in the private information corresponds to criteria in the normal information the private information is utilized in the driver processing of the private information. In one exemplary implementation, if the width, height and process id specified in the metadata matches the width, height and process identification (ID) respectively for a surface or texture BLIT, then the driver "intercepts" the call and performs additional processing on the data (e.g., processing in accordance with the metadata, etc.).

It is appreciated there a variety of different types of private information that can be communicated. The private information metadata can include description of features or characteristics of the normal information (e.g., the bit rate or frequency of the stream, the content type, format of the content, etc.). In one embodiment, metadata associated with still images can be communicated (e.g., what the image content type is, JPEG, etc.). In one embodiment, metadata associated with audio can be communicated. The metadata can include information that would enable a driver to use the metadata to enable higher-level quality algorithms to decrypt or decompress the normal information.

FIG. 4 is a flow chart of exemplary private communication method 400 in accordance with one embodiment of the present invention.

In block 410, a private information communication process is preformed in which private information is communicated from a browser to a driver. In block 411 normal information and private information from an application is forwarded to a runtime component. The normal information can include image information, surface or texture information, audio information, and various other types of information. In block 412, the normal information is forwarded from the runtime component to a driver and the private information is forwarded to a private information communication plug-in. In one embodiment, prior to the start of video playback, a browser player application determines the associated metadata, and sends that to the browser's Document Object Model (DOM) by invoking a JavaScript function using an HTML Bridge. Depending on the browser that is detected (e.g., by the JavaScript, etc.), the JavaScript then sends this metadata to the appropriate private information communication plug-in. In one exemplary implementation, if the browser is an Internet Explorer browser the information is forwarded to an ActiveX control plug-in and if the browser is a Firefox or Chrome browser the information is forwarded to a Netscape plug-in application programming interface (NPAPI) based plug-in. In block 413 the private information communication plug-in calls into a driver. In one exemplary implementation, if a call from the JavaScript is Set_Stereo Info(XXX, YYY, ZZZ) in which XXX, YYY and ZZZ are arguments, the private information communication plug-in scrambles the arguments and repacks them in a private backdoor call to the driver. In one embodiment, the private information communication plug-in calls into a graphics processing kernel mode driver by using a backdoor interface in order to send the metadata to the driver.

In block 420, a driver process is performed utilizing the private information communicated in the private information communication process of block 410. In one embodiment, the private information is utilized in coordination with normal information communicated to the driver. In one exemplary implementation, normal information communicated to browser includes content and the private information includes metadata corresponding to the content, and the metadata is utilized in driver processing activities associated with the content. In one embodiment, the metadata is associated with stereoscopic 3D video information. While one present example is described in terms of an implementation in which the source stereoscopic data is in a left-right format, it is appreciated similar logic can be extended to apply to other layout formats as well. In block 421, the driver copies the left and the right view data from the source texture into two separate surfaces, which are then page flipped. In block 422 active shutter glasses can ensure that the right "eye" is blanked out when the left view is being flipped, and that the left "eye" is blanked out when the right view is being flipped.

Present systems and methods can also include various security measures for the private information communication. In one embodiment, additional measures (e.g., obfuscating, replacing with symbols that appear nonsensical, scrambling, encrypting, etc.) can be implemented on the private information to increase security for the private information communication. In one exemplary implementation, the private information communication plug-in is implemented in a decompiled setting and susceptibility to attempts at maliciously overwriting registers is minimized. In one embodiment, the application component includes a communication component (e.g., communication box 319) that restricts information flow into the application component.

Figure 5:
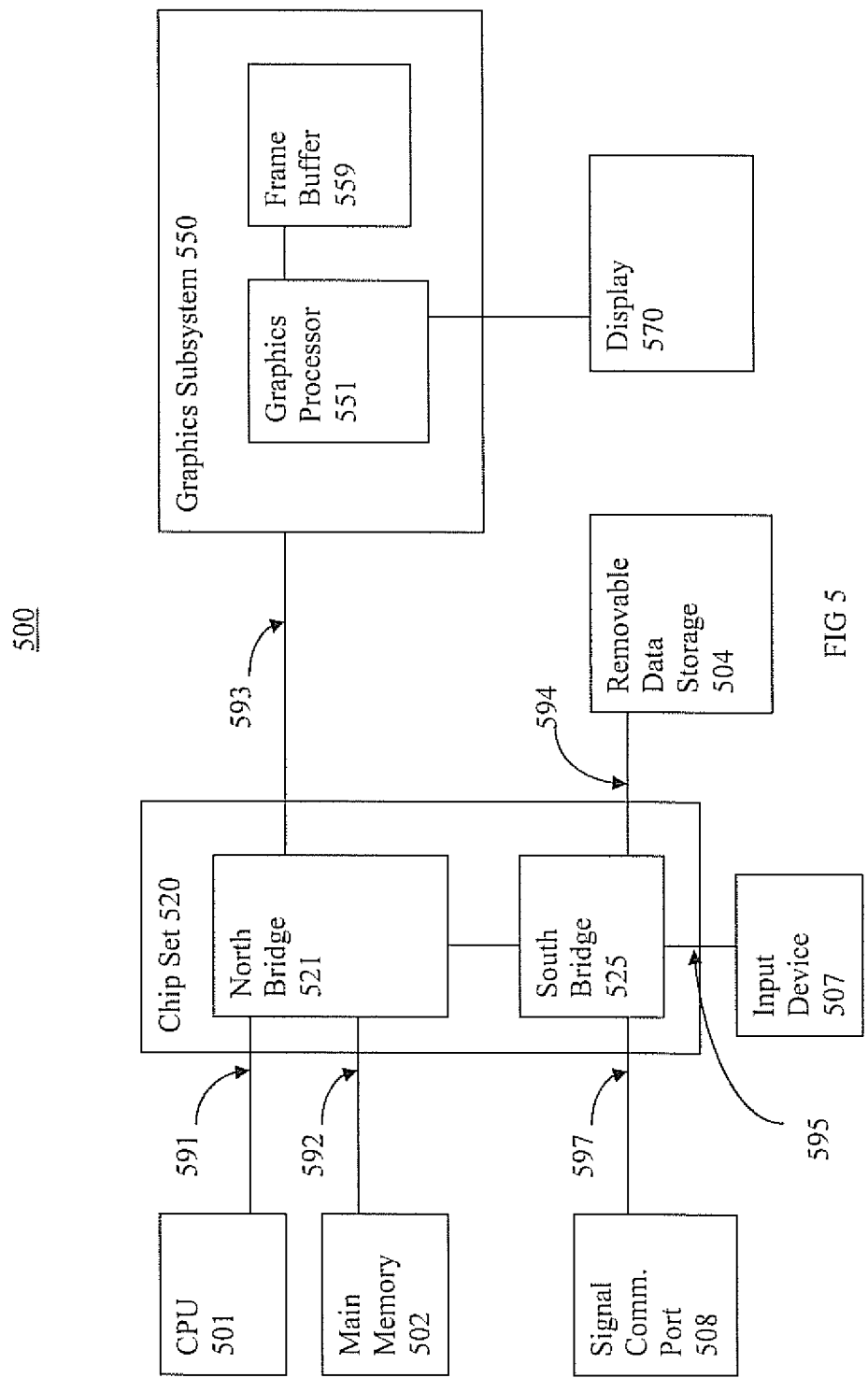
FIG. 5 is a block diagram of an exemplary computer system upon which embodiments of the present invention can be implemented.

FIG. 5 is a block diagram of a computer system 500, one embodiment of a computer system upon which embodiments of the present invention can be implemented. Computer system 500 includes central processor unit 501, main memory 502 (e.g., random access memory), chip set 520 with north bridge 521 and south bridge 525, removable data storage device 504, input device 507, signal communications port 508, and graphics subsystem 550 which is coupled to display 570. Computer system 500 includes several busses for communicatively coupling the components of computer system 500. Communication bus 591 (e.g., a front side bus) couples north bridge 521 of chipset 520 to central processor unit 501. Communication bus 592 (e.g., a main memory bus) couples north bridge 521 of chipset 520 to main memory 502. Communication bus 593 (e.g., the Advanced Graphics Port interface) couples north bridge of chipset 520 to graphic subsystem 550. Communication buses 594-597 (e.g., a PCI bus) couple south bridge 525 of chip set 520 to removable data storage device 504, input device 507, signal communications port 508 respectively. Graphics subsystem 550 includes graphics processor 551, memory management unit 555 and graphics buffer 559.

The components of computer system 500 cooperatively operate to perform a variety of processing tasks and facilitate efficient memory accesses. Communications bus 591, 592, 593, 594, 595 and 597 communicate information. Central processor 501 processes information. Main memory 502 stores information and instructions for the central processor 501. Removable data storage device 504 also stores information and instructions (e.g., functioning as a large information reservoir). Input device 507 provides a mechanism for inputting information and/or for pointing to or highlighting information on display 570. Signal communication port 508 provides a communication interface to exterior devices (e.g., an interface with a network). Display device 570 displays information in accordance with data stored in frame buffer 559. Graphics processor 551 processes graphics commands from central processor 501 and provides the resulting data to graphics buffers 559 for storage and retrieval by display monitor 570.

It is appreciated that the present invention can be implemented in a variety of embodiments. In one exemplary implementation the present invention can be utilized in processing systems utilized to provide a variety of graphics applications including video games. For example, the present invention can be utilized to disable defective components in a game console, personal computer, personal digital assistant, cell phone or any number of platforms for implementing a video game. It is also appreciated that references to video game application implementations are exemplary and the present invention is not limited to these implementations.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in modulated data signals such as carrier waves or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc, that perform particular tasks or implement particular abstract data types. Typically the functionality of the program modules may be combined or distributed as desired in various embodiments.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A private information communication method comprising:
performing a private information communication process in which private information is communicated through a dedicated private communication channel from a private information communication plug-in of a browser to a driver, wherein the dedicated private communication channel includes a backdoor interface, wherein the private information includes browser information that would otherwise not be communicated to the driver, wherein the private information further includes stereoscopic video information associated with graphics surface information; and
performing a driver process based upon the private communication information communicated in the private information communication process.

2. The private information communication method of claim 1 wherein the private information communication process comprises:
determining private information content;
communicating the private information to the private information communication plug-in coupled to the dedicated private communication channel;
calling a graphics driver from the private information communication plug-in using the dedicated private communication channel; and
forwarding the private information from the private information communication plug-in to the driver via the dedicated private communication channel.

3. The private information communication method of claim 1 wherein said private information includes metadata.

4. The private information communication method of claim 1 wherein said private information includes arguments.

5. The private information communication method of claim 1 wherein the driver process comprises:
determining if there is an association between normal information and the private information, and
processing the normal information in accordance with associated private information.

6. A computer system comprising:
a system operable to implement a display driver component which is operable to perform graphics processing unit interface operations with a display component, wherein the graphics processing unit interface operations with a display component include processing graphics surface information received from a normal information communication channel utilizing private information received via a dedicated private communication channel, wherein the dedicated private communication channel includes a backdoor interface, wherein the private information includes stereoscopic video information associated with the graphics surface information, wherein a graphics processor device is included in the system; and
the system operable to implement a browser component operable to forward the private information to the graphics processing unit display driver component via the private information communication channel through a dedicated private information communication plug-in of the browser component.

7. The computer system of claim 6 wherein the browser includes an application component.

8. The computer system of claim 7 wherein the browser includes a runtime component.

9. The computer system of claim 6 wherein the browser includes a java script component.

10. The computer system of claim 6 wherein the private information communication plug-in is installed when the driver is installed.

11. The computer system of claim 6 wherein the metadata includes the width of the player window, the height of the player window, the stereo mode, a flag indicating whether to enable or disable stereoscopic 3D rendering and process ID.

12. A non-transitory computer readable medium operable to store instructions for directing processor operations in a private communication process, wherein the private communication process comprises:
   performing a private information communication process in which private information is communicated through a private information communication plug-in of a browser to a driver, the private information communication plug-in coupled to a dedicated private communication channel, wherein the dedicated private communication channel includes a backdoor interface; and
   performing a driver process based upon the private communication information communicated in the private information communication process, wherein the private information includes stereoscopic video information associated with graphics surface information, wherein calls associated with normal information from an application communicated on a normal information communication channel are intercepted by the driver and processed utilizing corresponding portions of the private information communicated on the private channel.

13. The non-transitory computer readable medium of claim 12 wherein the private information communication process comprises:
   determining private information content;
   communicating the private information to the private information communication plug-in;
   calling a driver from the private information communication plug-in using the dedicated private communication channel, and forwarding the private information from the private information communication plug-in to the driver via the dedicated private communication channel.

14. The non-transitory computer readable medium of claim 12 wherein the private information includes metadata.

* * * * *